(12) United States Patent
Williams et al.

(10) Patent No.: US 6,780,384 B2
(45) Date of Patent: Aug. 24, 2004

(54) METHOD AND SYSTEM FOR RECOVERING ZIRCONIUM VALUES FROM A HARD ROCK ORE CONTAINING URANIUM

(75) Inventors: Allen L. Williams, Pueblo West, CO (US); Robert W. Philips, Jr., Muskegon, MI (US); David R. Tierney, Johnson City, TN (US); Daniel R. Dilday, Pueblo West, CO (US)

(73) Assignee: Cotter Corporation (NSL), Englewood, CA (US)

( * ) Notice: Subject to any disclaimer, the term of this patent is extended or adjusted under 35 U.S.C. 154(b) by 232 days.

(21) Appl. No.: 10/093,924

(22) Filed: Mar. 7, 2002

(65) Prior Publication Data

US 2002/0184972 A1 Dec. 12, 2002

Related U.S. Application Data

(60) Provisional application No. 60/274,267, filed on Mar. 8, 2001.

(51) Int. Cl.$^7$ ........................ C01G 25/00; C01G 56/00; C01B 33/00

(52) U.S. Cl. ................................. 423/70; 423/8; 423/9; 423/82

(58) Field of Search ............................... 423/70, 20, 8, 423/9, 10, 335

(56) References Cited

U.S. PATENT DOCUMENTS 4,746,497 A * 5/1988 Jenkins et al. ................ 423/82

* cited by examiner

Primary Examiner—Steven Bos
(74) Attorney, Agent, or Firm—Rader, Fishman & Grauer PLLC (57) ABSTRACT

A method of recovering zirconium values from an ore containing zircon, baddeleyite, and uranium is disclosed. The method includes fusing the ore with soda ash and contacting the resulting fused ore with sulfuric acid, which generates an acid leach liquor that contains zirconium and uranium values and solids that comprise baddeleyite and silica. Baddeleyite is recovered by contacting it with sulfuric acid to convert baddeleyite to zirconium sulfate, which can be dissolved in the acid leach liquor. The method also includes separating zirconium from uranium by solvent extraction followed by precipitation.

19 Claims, 6 Drawing Sheets

METHOD AND SYSTEM FOR RECOVERING ZIRCONIUM VALUES FROM A HARD ROCK ORE CONTAINING URANIUM

CROSS-REFERENCE TO RELATED APPLICATION

This application claims the benefit of U.S. Provisional Application No. 60/274,267, filed Mar. 8, 2001.

BACKGROUND OF THE INVENTION

1. Field of the Invention

The present invention relates to chemical and physical treatment of hard-rock ores to recover uranium and zirconium compounds.

2. Discussion

Techniques exist for extracting uranium from hard rock ores. However, no methods currently exist for recovering other metal values, such as zirconium, in high purity ($\geq 98.5$ wt. %) from uranium-tainted ores, including Caldasite ores.

SUMMARY OF THE INVENTION

The present invention provides a method of recovering zirconium values from an ore containing zircon, baddeleyite, and uranium. The method includes contacting the ore with sulfuric acid to produce a liquid phase comprised of zirconium and uranium values and a solid phase comprised of baddeleyite and silica. In accordance with the method, silica is separated from the baddeleyite by dispersing the solid phase in an aqueous basic solution to dissolve the silica. Baddeleyite is further concentrated by contacting the solid phase with sulfuric acid to convert baddeleyite to zirconium sulfate, which is soluble in the liquid phase. To concentrate the zirconium values, the method provides for contacting the liquid phase with an organic phase in order to extract the zirconium and uranium values into the organic phase, which is contacted with an aqueous solution to strip off zirconium values. Generally, the method provides for contacting either the ore or the baddeleyite with sulfuric acid at a temperature between about 135° C. and about 255° C., and often at a temperature between about 175° C. and 255° C.

DETAILED DESCRIPTION OF THE PREFERRED EMBODIMENTS

Figure 1:
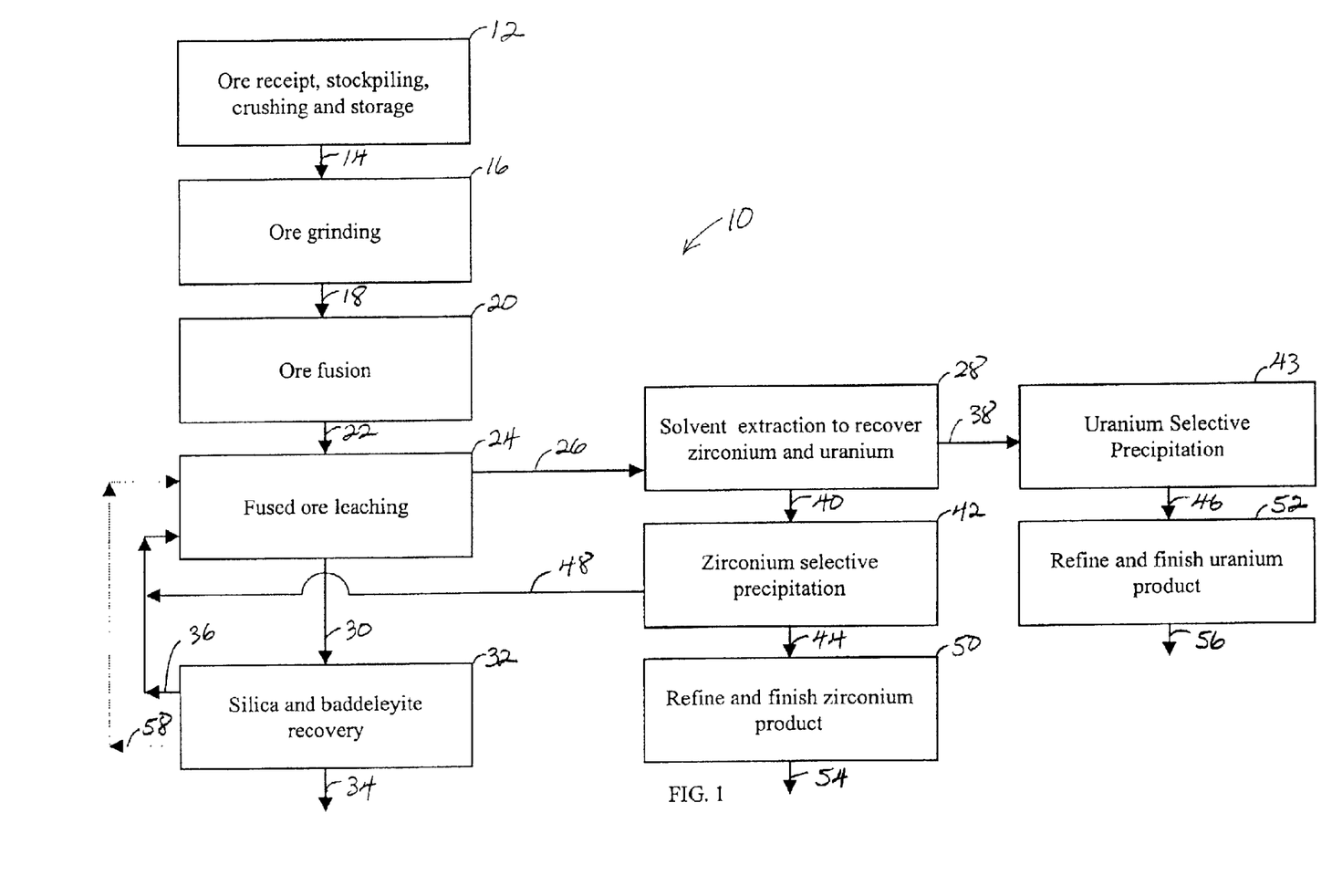
FIG. 1 is a block diagram that shows a process for recovering zirconium and uranium values from a hard-rock ore.

FIG. 1 provides an overview of a process 10 for recovering zirconium oxide ($ZrO_2$), uranium yellowcake ($U_3O_8$) and silica ($SiO_2$) from a hard-rock ore. Useful ores include those that comprise a mixture of zircon ($ZrSiO_4$), baddeleyite ($ZrO_2$), and uranium. Suitable ores may include about 0.05 wt. % or more uranium, and typically include about 0.2 wt. % or more uranium. Such ores are considered uranium source materials under 10 C.F.R. §40.4. A particularly useful ore includes Caldasite ore, which is extracted from the Pocos de Caldas Plateau region of Brazil. Table 1 lists the nominal composition of Caldasite ore. As used herein, "zirconium," "uranium," etc. may refer to zirconium and uranium atoms or to compounds containing zirconium and uranium atoms. More generally, a "metal" or "metal value" may refer to a metal atom or to compounds that contain a metal atom.

TABLE 1

Composition of Caldasite Ore

| Constituent | Wt. % |
|---|---|
| Zircon, $ZrSiO_4$ | 50–73 |
| Baddeleyite, $ZrO_2$ | 17–30 |
| Calcite, $CaCO_3$ | 0–3 |
| Dolomite, $CaMg(CO_3)_2$ | 5–8 |
| Quartz, $SiO_2$ | 0–3 |
| Feldspar, $(Na, Ca, K)Al(Si, Al)_3O_8$ | 0–3 |
| Ilmenite, $FeTiO_3$ | 0–3 |
| Mica, $(Na, Ca, K)(Al, Mg, Fe)_2(Si, Al)_4O_{10}(OH)_2$ | 0–3 |
| Chlorite, $(Al, Mg, Fe)_6(Si, Al)_4O_{10}(OH)_8$ | 0–3 |
| Aluminum | 0–5 |
| Uranium | 0.2–1.0 |
| Trace Metals | 0–1.0 |

As shown in FIG. 1, after the ore is received, stockpiled, crushed and stored 12, the crushed ore 14 is transported to a grinding operation 16, where the ore is reduced to a requisite size (generally less than about 100 mesh and often less than about 200 mesh) for subsequent chemical and physical treatment. The ground ore 18 (slurry) is fed to an ore fusion operation 20, where the ore is mixed with soda ash and fused in a rotary kiln. The fused ore 22 is leached 24, first with water and then with high temperature acid (e.g., 135° C.–255° C.), resulting in an acid leach liquor 26 that is fed to a solvent extraction operation 28 to recover zirconium and uranium values. Solids 30 from acid leaching 24 are sent to a silica and baddeleyite recovery operation 32, where silica 34 is separated through acid precipitation and baddeleyite is converted to zirconium sulfate 36. Since zirconium sulfate 36 is acid soluble, it is returned upstream to the acid leach stage of the fused ore leaching operation 24 so that it comprises a portion of the acid leach liquor 26 that is fed to the solvent extraction operation 28.

As can be seen in FIG. 1, two aqueous strip streams 38, 40 from the solvent extraction operation 28 are transported to a selective precipitation operation 42 to separate zirconium 44 and uranium 46 values from contaminants 48, such as iron, silica, titanium and niobium. Because one of the contaminant streams 48 typically contains zirconium, it is recycled back to the high temperature acid leach stage of the fused ore leaching operation 24. The zirconium 44 and uranium 46 values are purified in refining 50, 52 operations that produce high purity (greater than about 98.5 wt. %) $ZrO_2$ 54 and $U_3O_8$ 56. Note that residue solids 58 following baddeleyite recovery 32 contain unreacted zircon. As a result, normal ore processing may be periodically discontinued to allow reprocessing of the residue solids 58 beginning with ore fusion 20, which is indicated by the dotted line in FIG. 1.

FIG. 2–FIG. 6 show details of the ore grinding 16, fusion 20, fused ore leaching 24, silica and baddeleyite recovery 32, solvent extraction 28 and selective precipitation 42, 43 of zirconium and uranium, and zirconium refining and finishing operations 50. The process descriptions often identify useful equipment for carrying out the process. However, it should be understood that the identification of any particular process equipment is not intended to limit the disclosed method 10.

Figure 2:
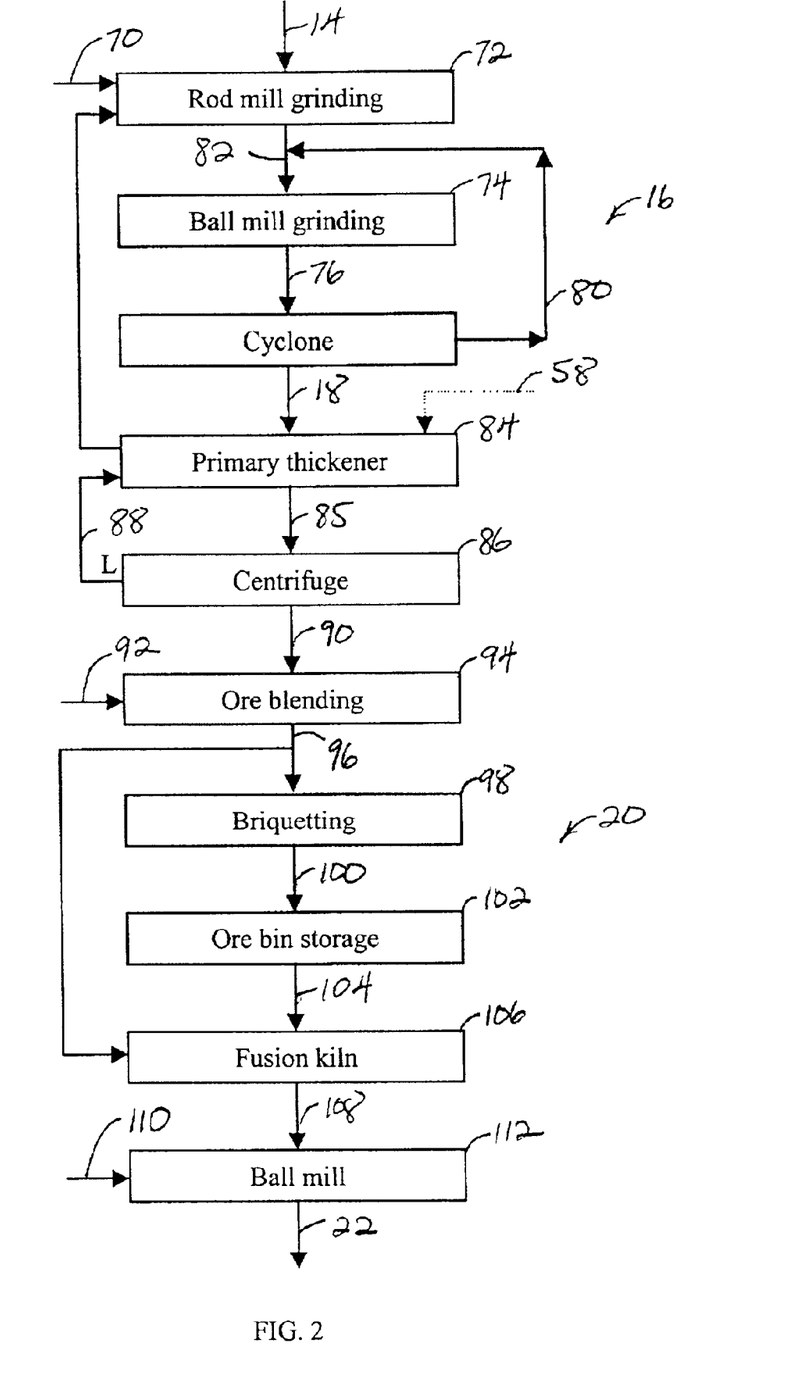
FIG. 2 is a block diagram that shows ore grinding and ore fusion operations.

FIG. 2 is a block diagram showing details of the grinding 16 and ore fusion 20 operations. Crushed ore 14, which is less than about two inches in size, is fed along with water 70 to a series of rod 72 and ball 74 mills, which reduce the size of the crushed ore 14. Output 76 from the ball mill 74 is sized by one or more cyclones 78 to less than about 200 mesh. The cyclones 78 return oversized ore 80 to the ball mill 74 input stream 82 and direct the ground ore slurry 18 having the requisite size into a primary thickener 84, which concentrates the ore solids in preparation for ore fusion 20.

Ore fusion 20 converts zircon and associated uranium into compounds that can be leached or dissolved into a liquid solution with sulfuric acid. As shown in FIG. 2, the underflow or ground ore slurry 85 from the primary thickener 84 is optionally de-watered in a centrifuge 86. Process water 88 from the centrifuge 86, which may contain dissolved zirconium and uranium values, is recycled back to the primary thickener 84. The de-watered ore 90 (or the ground ore slurry 85) is combined with soda ash ($Na_2CO_3$) 92 in a blending operation 94. The resulting mixture 96 may be rolled 98 into briquettes 100, stored 102 in bins, and transported 104 to a rotary kiln 106. In other embodiments, the slurry 96 from the blending operation 94 may be fed directly to the rotary kiln 106. In either case, zircon fuses with soda ash in the rotary kiln 106 at about 1000° C. in accordance with the following formula:

$$ZrSiO_4 + Na_2CO_3 \rightarrow Na_2ZrSiO_5 + CO_2 \qquad \text{I}$$

Output 108 of the rotary kiln 106 is mixed with water 110, crushed in a second ball mill 112, and undergoes further treatment in the leaching operation 24 described next. Since the Baddeleyite fraction of the ore does not fuse, it is recovered in a separate operation 32 described below.

Figure 3:
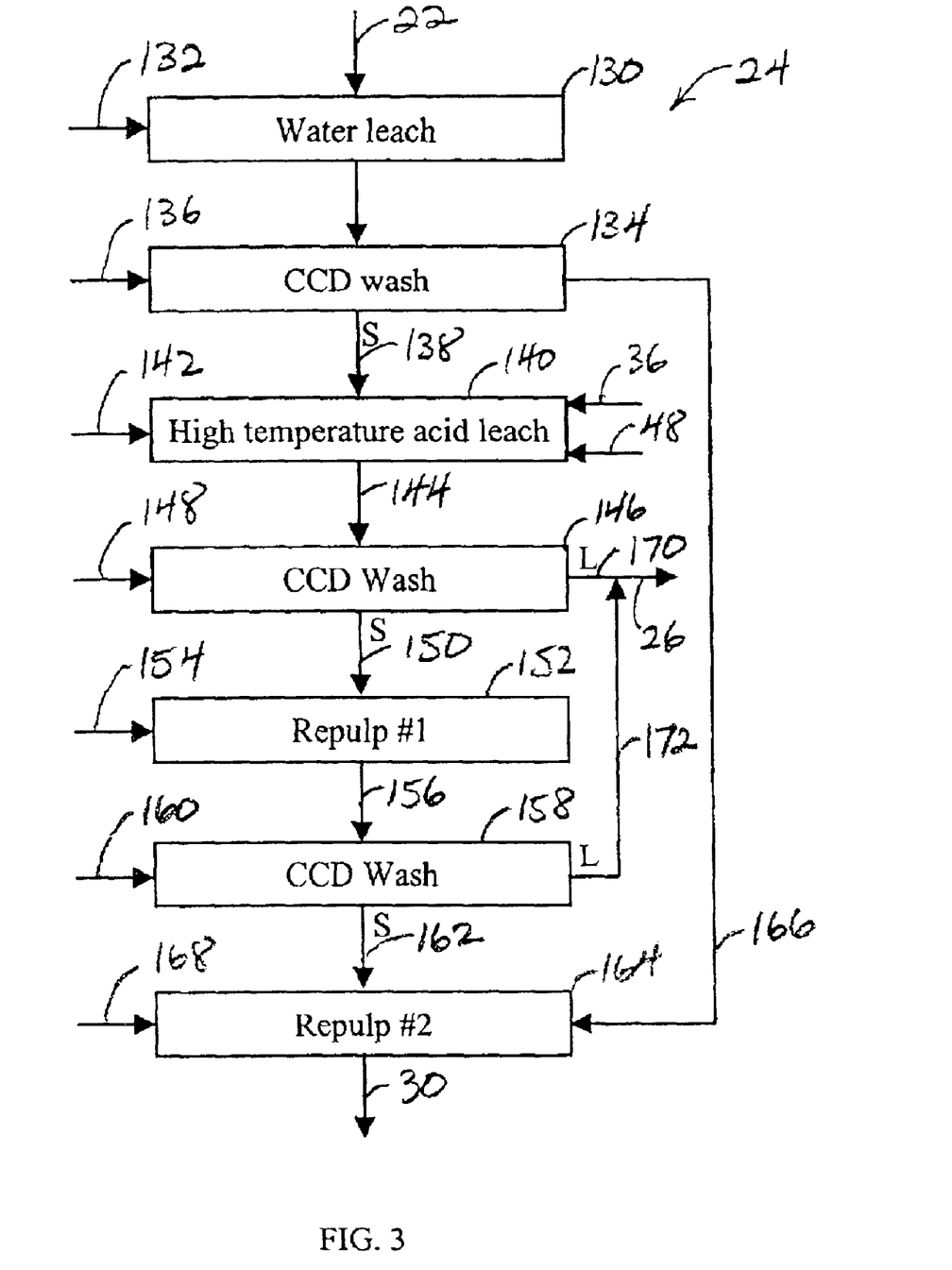
FIG. 3 is a block diagram that shows a fused ore leaching operation.

FIG. 3 shows a block diagram of the fused ore leaching operation 24. The fused ore 22 from the second ball mill 112 is first leached 130 with steam 132 at 60° C. in one or more leach tanks, and is subsequently washed 134 with treated water 136 in a series of counter-current decanters (CCDs). A solid (slurry) stream 138 from the CCDs is fed to a series of tanks where the fused ore—along with zirconium sulfate 36 and contaminant 48 streams from baddeleyite recovery 32, solvent extraction 28 and selective precipitation 42 operations—are leached 140 with concentrated sulfuric acid ($H_2SO_4$) 142 for about one to two hours in a glass lined reactor and at a temperature between about 135° C. and 255° C. High temperature acid leaching 140 converts the fused ore ($Na_2ZrSiO_5$) to zirconium sulfate ($Zr(SO_4)_2$) and silica in accordance with the following formula:

$$Na_2ZrSiO_5 + 3H_2SO_4 \rightarrow Zr(SO_4)_2 + 3H_2O + SiO_2\downarrow \qquad \text{II}$$

Figure 4:
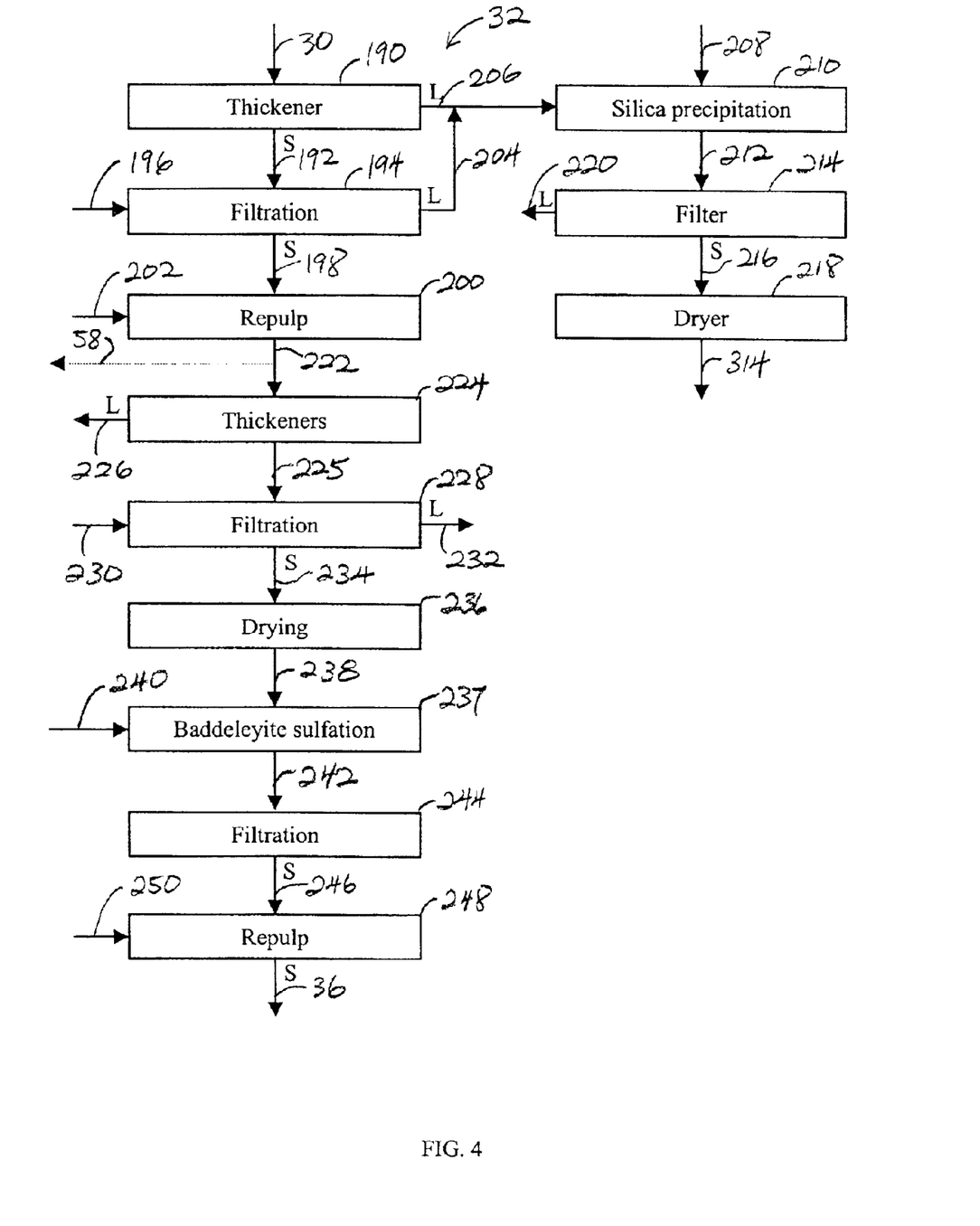
FIG. 4 is a block diagram that shows silica and baddeleyite recovery operations.

Product 144 from high temperature acid leaching 140 is washed 146 with sulfuric acid 148, and the solids 150 are repulped 152 with treated water 154. The repulped ore solids 156 are subsequently separated and washed 148 with treated water 160. The filter cake 162 is repulped 164 with liquid overflow 166 from the CCDs and with sodium hydroxide (NaOH) 168, which raises the pH of the resulting slurry 30 sufficient to dissolve silica formed during acid leaching. The repulped ore solids 30 undergo further treatment in the silica and baddeleyite recovery operation 32. Additionally, CCD overflow streams 170, 172, which contain dissolved $Zr(SO_4)_2$ and associated uranium, combine to form acid leach liquor 26 that is fed to the solvent extraction operation 28 to recover zirconium and uranium values FIG. 4 is a block diagram showing the silica and baddeleyite recovery operation 32. Repulped ore solids 30 from the fused ore leaching operation 24 are fed to a thickener 190. Ore slurry 192 or underflow from the thickener 190 is filtered 194 and washed with treated water 196, and the filter cake 198 is repulped 200 with treated water 202. Filtrate 204 and liquid-phase overflow 206 from the thickener 190, which contain dissolved silica, are combined and treated in a series of tanks with sulfuric acid 208 at ambient temperature. The acid treatment precipitates 210 silica, which is separated from the resulting slurry 212 by vacuum filtration 214. The filter cake 216 is dried 218 using, for example, a rotating screw-type dryer, and the filtrate 220 is sent to tail ponds for disposal.

As shown in FIG. 4, baddeleyite can be recovered from repulped ore solids 222, which are fed to a series of thickeners 224 that accumulate the ore solids 222. Once the thickeners 224 are full, regular ore processing may be discontinued and processing of residue solids 225 (underflow) from the thickeners 224 starts, beginning with baddeleyite recovery and continuing with residue fusion. During baddeleyite recovery, liquid overflow 226 from the thickeners 224 is sent to tail ponds, and the residue solids 225 are filtered 228 and washed with treated water 230. The filtrate 232 is sent to tail ponds and the filter cake 234 is optionally dried 236 using one or more rotating screw-type dryers. Baddeleyite is converted 237 to zirconium sulfate by contacting dried residue solids 238 with concentrated $H_2SO_4$ 240 at a temperature between about 200° C. and 255° C. in a glass-lined reactor in accordance with the following formula:

$$ZrO_2 + 2H_2SO_4 \rightarrow Zr(SO_4)_2 + 2H_2O \qquad \text{III}$$

Following sulfation, the reaction product 242 is filtered 244. Filtrate 245, which contains unreacted sulfuric acid, is returned to the baddeleyite sulfation 237. The filter cake 246 is repulped 248 with treated water 250. The repulped solid or zirconium sulfate product 36 is returned to the steam leach stage 130 of the fused ore leaching operation 24 where the product 36 comprises a portion of the acid leach liquor 26 that is fed to the solvent extraction operation 28.

Referring to FIG. 1 and to FIG. 4, residue solids 58 from the silica and baddeleyite recovery operations 32 are reprocessed through the fusion 20 and leaching 24 operations to recover unreacted zircon. The resulting acid leach liquor 26 is processed through the solvent extraction operation 28, uranium and zirconium selective precipitation operation 42, and the zirconium 50 and uranium 52 refining and finishing operations as described below.

Figure 5:
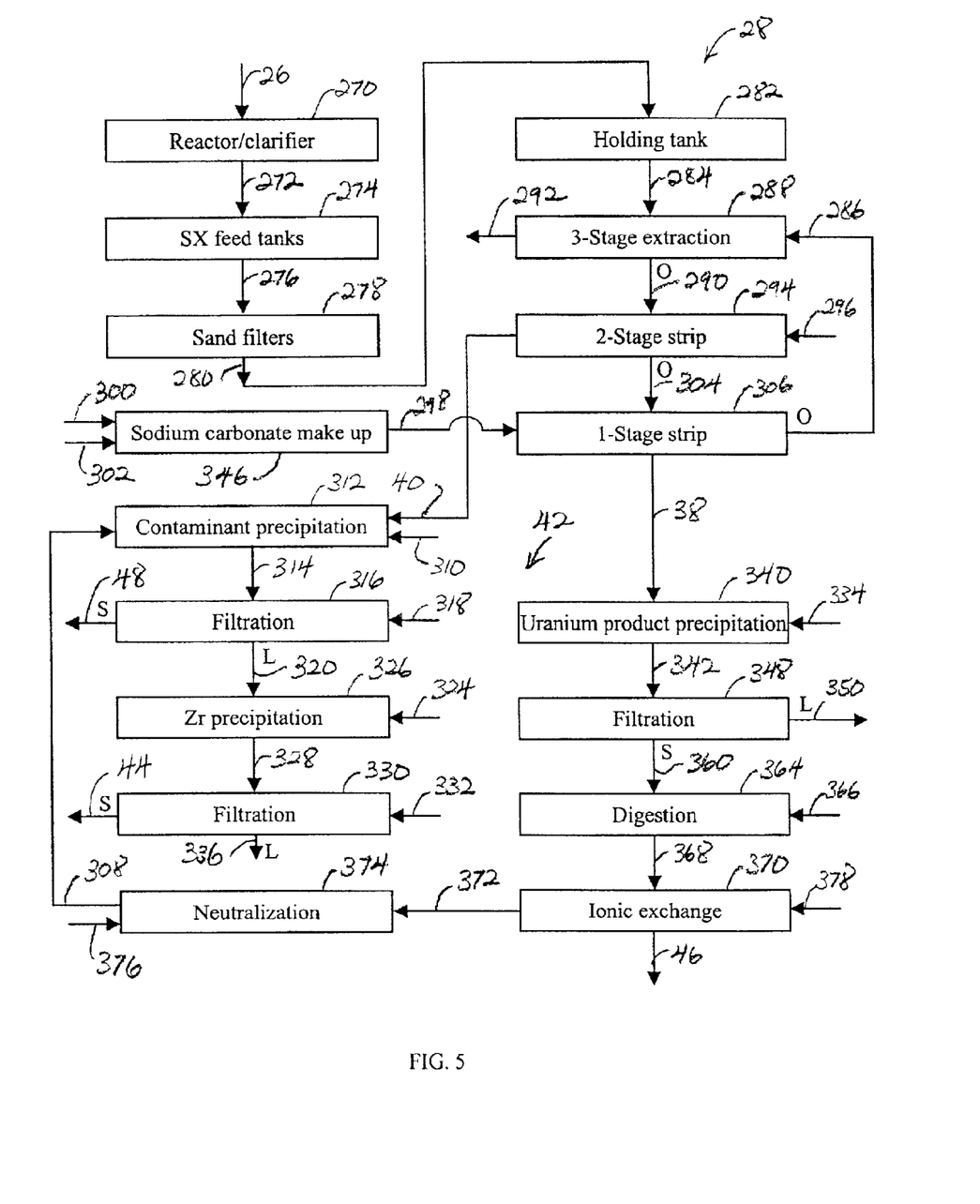
FIG. 5 is a block diagram that shows solvent extraction and selective uranium and zirconium precipitation operations.

FIG. 5 is a block diagram that shows solvent extraction 28 and zirconium 42 and uranium 43 selective precipitation operations. Prior to solvent extraction, the acid leach liquor 26 from the fused ore leaching operation 24 is fed to a reactor-clarifier 270 that removes residual solids. Reactor-clarifier overflow 272 is stored in feed tanks 274. Effluent 276 from the feed tanks 274 passes through sand or garnet filters 278 to remove residual solids. Output 280 from the filters 278 is temporarily stored in a holding tank 282. Aqueous feed liquor 284 from the holding tank 282 is contacted with a counter-current stream of an organic phase 286 in a multi-stage extraction process 288. Although the embodiment shown in FIG. 5 uses three mixer-settler stages, the number of stages can be increased to process larger amounts of ore or to increase the purity level for a given amount of ore throughput.

The organic phase 286 is comprised of an extractant, a non-flammable and low volatility diluent, and a modifier. Useful extractants, diluents, and modifiers include, respectively, tertiary amines, including ALAMINE 336 available from CONOCO, kerosene, including ES 170 available from CONOCO, and alcohols, including tridecanol. The extractant typically comprises less than about 25 wt. % of the organic phase 286 and preferably comprises about 20 wt. % of the organic phase 286. The modifier typically comprises between about 5–15 wt. % of the organic phase 286 and preferably comprises about 10 wt. % of the organic phase 286, and the diluent comprises the balance of the organic phase 286. The modifier controls the phase separation behavior of the organic phase 286 so that adding too little modifier results in poor phase separation, while adding too much modifier results in fast phase separation, but poor extraction performance.

As shown in FIG. 5, zirconium and uranium are selectively extracted into an organic phase 290, which leaves most of the impurities behind in an aqueous raffinate stream 292. The organic phase 290, now loaded with zirconium and uranium, is stripped 294 with a mixture of sodium chloride (NaCl) and hydrochloric acid (HCl) 296 in two mixer-settler stages in order to remove zirconium 40 from the organic phase. A second strip liquor 298 comprised of water 300 and sodium carbonate 302 strips uranium off an organic phase 304 in a one-stage stripping process 306. The organic phase 286, depleted of zirconium and uranium, is returned to the multi-stage extraction process 288 where it contacts fresh aqueous feed liquor 284. The aqueous strip 40, enriched with zirconium, is fed to the zirconium selective precipitation operation 42 to separate zirconium values.

Referring to FIG. 5, the zirconium-enriched aqueous strip 40 is further purified by adding ammonia ($NH_3$) 310, which precipitates 312 undesirable impurities such as iron (gerasite) and niobium at a pH of about 2.0–2.5. The resulting slurry 314 is filtered 316 and washed with water 318. As noted above, the contaminant stream 48 (filter cake) is recycled back to the high temperature acid leach 140 of the fused ore leaching operation 24. The filtrate 320 is combined with $NH_3$ 324, which precipitates 326 zirconium at a pH of about 4.0–7.0. The resulting slurry 328 is filtered 330 and washed with water 332. The zirconium 44 filter cake, which is known as zirconium hydrate, is purified in a subsequent refining operation 50. The liquid filtrate 336 is sent to tail ponds.

The uranium precipitate 342 is filtered 348 and the liquid filtrate 350 is sent to tail ponds. Because the zirconium precipitation operation 326 does not remove all of the zirconium from solution, the uranium filter cake 360 contains a significant amount of zirconium (about 5–10 wt. % of the recoverable zirconium in the ore) that should be separated from the uranium 360 and recovered. One useful technique includes dissolving 364 the uranium filter cake 360 with a combination of calcium chloride solution and hydrochloric acid (HCl) 366. A resulting digest liquor 368 is fed to an ion exchange system 370, which selectively removes the uranium leaving zirconium in the ion exchange effluent 372. Residual HCl in the effluent 372 is neutralized 374 with lime (CaO) 376, which makes up the calcium chloride solution 308 that was used to precipitate 312 impurities in the aqueous strip 40. Uranium 46 is eluted off the ion exchange system 370 using water 378, and is subsequently purified in the uranium refining operation 52.

Figure 6:
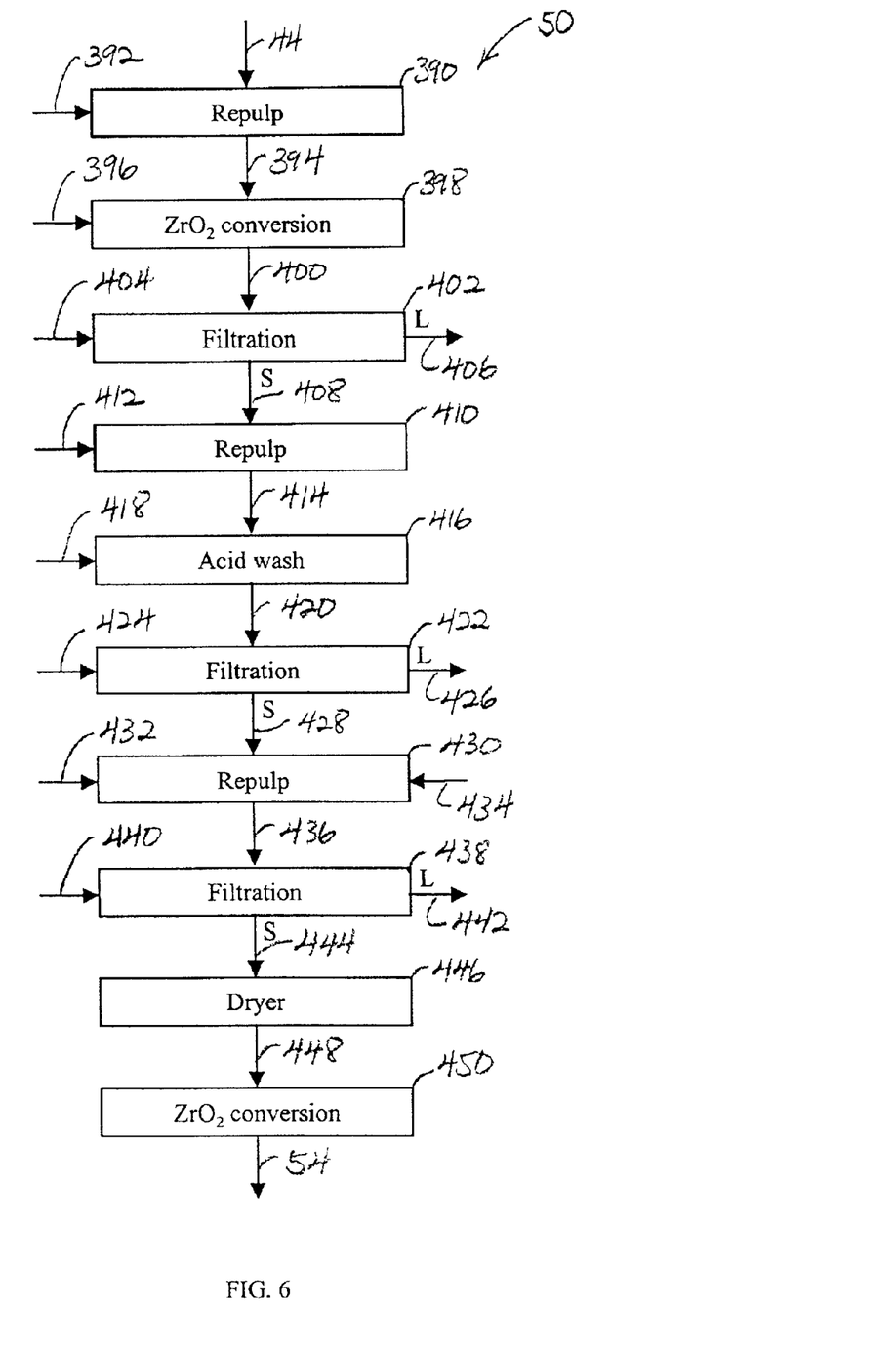
FIG. 6 is a block diagram that shows a zirconium refining and finishing operation.

FIG. 6 is a block diagram that shows the zirconium refining and finishing operation 50. The zirconium 44 filter cake is repulped 390 with water 392, and the resulting slurry 394 may be washed with sulfuric acid 396 to convert 398 zirconium hydrate to zirconium sulfate. The reaction product 400 is filtered 402 and washed with water 404. The filtrate 406 is sent to tail ponds and the filter cake 408 is repulped 410 with water 412. Optionally, the repulped solids 414 undergo acid washing 416 with HCl 418 to remove residual contaminants, including uranium. The resulting slurry 420 (or repulped solids 414) is filtered 422 and washed with water 424. The filtrate 426 is sent to tail ponds, and the filter cake 428 is repulped 430 with water 432 and washed with ammonium hydroxide 434 to remove sulfate in accordance with the following formula:

$$Zr(SO_4)_2 + 4NH_4OH \rightarrow Zr(OH)_4 + 2(NH_4)_2SO_4 \qquad IV$$

The resulting product slurry 436 is filtered 438 and washed with water 440. The filtrate 442 is sent to tail ponds, and the filter cake 444 is dried 446 in a rotary screw-type dryer. The dried zirconium product 448 is calcined 450 in a rotary kiln at a temperature between about 800° C. and 900° C. to produce a zirconium oxide final product 54.

Finally, uranium 46 from the uranium and zirconium selective precipitation operation 42 is refined and finished 52 in a manner analogous to zirconium refining 50. Standard industry techniques may be used to generate uranium yellowcake ($U_3O_8$). For example, dissolved uranium 46 eluted off the ion exchange system 366 can be precipitated at a pH of about 11.0–12.0 through addition of sodium hydroxide. The precipitate, uranyl sulfate, is treated with ammonium hydroxide to remove sulfate and then calcined in a rotary kiln at about 850° C. to form uranium yellowcake.

It should be understood that the above description is intended to be illustrative and not limiting. Many embodiments will be apparent to those of skill in the art upon reading the above description. Therefore, the scope of the invention should be determined, not with reference to the above description, but instead with reference to the appended claim, along with the full scope of equivalents to which such claim is entitled. The disclosures of all patents, articles and references, including patent applications and publications, if any, are incorporated herein by reference in their entirety and for all purposes.

What is claimed is:

1. A method of recovering zirconium values from an ore containing zircon, baddeleyite, and uranium, the method comprising:
    contacting the ore with sulfuric acid at a temperature of about 135° C. or greater to produce a liquid phase comprising zirconium and uranium values and a solid phase comprising baddeleyite and silica;
    separating silica from baddeleyite by dispersing the solid phase in an aqueous basic solution to dissolve the silica;
    concentrating the baddeleyite by contacting the solid phase with sulfuric acid at a temperature of about 135° C. or greater to convert baddeleyite to zirconium sulfate, the zirconium sulfate being soluble in the liquid phase;
    contacting the liquid phase with an organic phase so as to extract the zirconium and uranium values into the organic phase; and
    contacting the organic phase with an aqueous solution to strip off zirconium values.

2. The method of claim 1, wherein contacting the ore with sulfuric acid occurs at a temperature of about 255° C. or less.

3. The method of claim 1, wherein contacting the solid phase with sulfuric acid occurs at a temperature of about 255° C. or less.

4. The method of claim 1, further comprising contacting the organic phase with a second aqueous solution to strip off uranium.

5. The method of claim 1, further comprising briquetting the ore.

6. The method of claim 1, further comprising fusing the ore.

7. The method of claim 1, further comprising adjusting the pH of the aqueous solution to precipitate zirconium values.

8. A method of recovering zirconium values from an ore containing zircon, baddeleyite, and uranium, the method comprising:
   contacting the ore with sulfuric acid at a temperature between about 135° C. and 255° C. to produce a liquid phase comprising zirconium and uranium values and a solid phase comprising baddeleyite and silica;
   separating silica from baddeleyite by dispersing the solid phase in an aqueous basic solution to dissolve the silica;
   concentrating the baddeleyite by contacting the solid phase with sulfuric acid at a temperature of about 135° C. and 255° C. to convert baddeleyite to zirconium sulfate, the zirconium sulfate being soluble in the liquid phase;
   contacting the liquid phase with an organic phase so as to extract the zirconium and uranium values into the organic phase; and
   contacting the organic phase with an aqueous solution to strip off zirconium values.

9. The method of claim 8, further comprising contacting the organic phase with a second aqueous solution to strip off uranium.

10. The method of claim 8, further comprising briquetting the ore.

11. The method of claim 8, further comprising fusing the ore.

12. The method of claim 8, further comprising adjusting the pH of the aqueous solution to precipitate zirconium values.

13. A method of recovering zirconium values from an ore containing zircon, baddeleyite, and uranium, the method comprising:
   fusing the ore by mixing the ore with soda ash and heating the ore and the soda ash;
   leaching the fused ore with sulfuric acid at a temperature of about 135° C. or greater to produce an acid leach liquor comprising zirconium and uranium values and solids comprising baddeleyite and silica;
   separating silica from baddeleyite by dispersing the solids in an aqueous basic solution to dissolve the silica;
   concentrating the baddeleyite by contacting the solids with sulfuric acid at a temperature of about 135° C. or greater to convert baddeleyite to zirconium sulfate, the zirconium sulfate being soluble in the acid leach liquor;
   contacting the acid leach liquor with an organic phase so as to extract the zirconium and uranium values into the organic phase; and
   contacting the organic phase with an aqueous solution to strip off zirconium values.

14. The method of claim 13, wherein leaching the ore with sulfuric acid occurs at a temperature of about 255° C. or less.

15. The method of claim 13, wherein contacting the solids with sulfuric acid occurs at a temperature of about 255° C. or less.

16. The method of claim 13, further comprising contacting the organic phase with a second aqueous solution to strip off uranium.

17. The method of claim 13, further comprising briquetting the ore.

18. The method of claim 13, further comprising adjusting the pH of the aqueous solution to precipitate zirconium values.

19. A method of recovering zirconium values from an ore containing zircon, baddeleyite, and uranium, the method comprising:
   contacting the ore with sulfuric acid to produce a liquid phase comprising zirconium and uranium values and a solid phase comprising baddeleyite and silica;
   separating silica from baddeleyite by dispersing the solid phase in an aqueous basic solution to dissolve the silica;
   concentrating the baddeleyite by contacting the solid phase with sulfuric acid to convert baddeleyite to zirconium sulfate, the zirconium sulfate being soluble in the liquid phase;
   contacting the liquid phase with an organic phase so as to extract the zirconium and uranium values into the organic phase; and
   contacting the organic phase with an aqueous solution to strip off zirconium values.

* * * * *